US011910805B2

(12) United States Patent
Tew et al.

(10) Patent No.: US 11,910,805 B2
(45) Date of Patent: *Feb. 27, 2024

(54) FOOD PRODUCT AND METHOD OF MANUFACTURE

(71) Applicant: The Princeton Group Inc—C40917, Basseterre (KN)

(72) Inventors: Samuel Beng Tew, Prahran (AU); Mark Anthony Hanna, Prahran (AU)

(73) Assignee: The Princeton Group Inc—C40917, Basseterre (KN)

( * ) Notice: Subject to any disclaimer, the term of this patent is extended or adjusted under 35 U.S.C. 154(b) by 0 days.

This patent is subject to a terminal disclaimer.

(21) Appl. No.: 17/650,740

(22) Filed: Feb. 11, 2022

(65) Prior Publication Data

US 2022/0159989 A1 May 26, 2022

Related U.S. Application Data

(63) Continuation of application No. 16/617,303, filed as application No. PCT/AU2018/050525 on May 30, 2018, now Pat. No. 11,278,039.

(30) Foreign Application Priority Data

May 30, 2017 (AU) ................. 2017902052

(51) Int. Cl.
*A23G 1/36* (2006.01)
*A23L 25/00* (2016.01)
*A23D 7/005* (2006.01)
*A23G 1/40* (2006.01)

(52) U.S. Cl.
CPC ............ *A23G 1/36* (2013.01); *A23D 7/0056* (2013.01); *A23G 1/40* (2013.01); *A23L 25/30* (2016.08)

(58) Field of Classification Search
CPC .. A23G 1/36; A23G 1/40; A23L 25/30; A23D 7/0056
See application file for complete search history.

(56) References Cited

U.S. PATENT DOCUMENTS

| 4,228,089 | A | * | 10/1980 | Bischof | B01D 35/18 62/541 |
|---|---|---|---|---|---|
| 4,865,866 | A | | 9/1989 | Moore | |
| 5,240,726 | A | | 8/1993 | Zook et al. | |
| 5,294,455 | A | | 3/1994 | O'Brien et al. | |
| 5,520,950 | A | | 5/1996 | Rosenplenter | |
| 5,876,781 | A | | 3/1999 | Lasdon et al. | |
| 6,045,850 | A | | 4/2000 | Kondou | |
| 8,906,441 | B2 | | 12/2014 | Rajesh et al. | |
| 2004/0219285 | A1 | | 11/2004 | Lasdon | |
| 2005/0142276 | A1 | | 6/2005 | Slesinski et al. | |
| 2011/0091636 | A1 | | 4/2011 | Elleman et al. | |
| 2013/0078359 | A1 | | 3/2013 | Rajesh et al. | |

FOREIGN PATENT DOCUMENTS

| BR | PI0801674 A2 | 2/2010 |
|---|---|---|
| BR | PI0901526 A2 | 1/2011 |
| EP | 0653169 A1 | 5/1995 |
| IT | 20130015 U1 | 1/2015 |
| JP | S56144053 A | 11/1981 |
| JP | 104287659 A | 10/1992 |
| JP | H07194306 A | 8/1995 |
| JP | 2014533522 A | 12/2014 |
| RU | 2185737 C1 | 7/2002 |
| RU | 2445781 C2 | 3/2012 |
| WO | 97/26296 A1 | 7/1997 |
| WO | 1997040700 A1 | 11/1997 |
| WO | 99/21439 A1 | 5/1999 |
| WO | 2011107993 A1 | 9/2011 |
| WO | 2013079716 A1 | 6/2013 |
| WO | 2014200909 A1 | 12/2014 |
| WO | 2015072913 A1 | 5/2015 |
| WO | 2017055102 A1 | 4/2017 |
| WO | 2018218290 A1 | 12/2018 |

OTHER PUBLICATIONS

International Search Report issued in corresponding International Application No. PCT/AU2018/050525 dated Jul. 16, 2018 (4 pages).
Written Opinion issued in corresponding International Application No. PCT/AU2018/050525 dated Jul. 16, 2018 (4 pages).
Examination Report issued in corresponding AU Application No. 2018276061 dated Feb. 22, 2019 (3 pages).
Examination Report issued in corresponding AU Application No. 2018276061 dated Feb. 18, 2020 (3 pages).
Notice of Acceptance issued in corresponding AU Application No. 2018276061 dated Feb. 26, 2020 (3 pages).
International Search Report issued in International Application No. PCT/IB2019/060205 dated Mar. 6, 2020 (4 pages).
Written Opinion issued in International Application No. PCT/IB2019/060205 dated Mar. 6, 2020 (7 pages).
Schmieder,R.L et al. "Characterisation and quantification of starch in cocoa beans and chocolate products" Journal of Food science, 45, 1980, pp. 555-557 and 563 (4 pages).
Oscars Mum, "Chocolate Nut Spread", http://www.cooking.foroscar.com/recipe/chocolate-nut-spread—accessed May 1, 2021 (1 page).
Pages 7-14 to 7-19 Crc_Handbook_of_Chemistry_and_Physics_----_(Section_7_Biochemistry) Copyright 2016 CRC Press LLC (6 pages).
Shea Oil, Refined—Garden State Naturals <https://www.gardenstatenaturals.com/product/shea-oil-refined/?v=914fddbcac3b> (3 pages).

(Continued)

*Primary Examiner* — Jeffrey P Mornhinweg
(74) *Attorney, Agent, or Firm* — Osha Bergman Watanabe & Burton LLP

(57) ABSTRACT

A low sugar content sweet food spread is provided said food spread comprising at least one of a cocoa product and a nut product, at least one vegetable oil and at least one sweetener. The at least one vegetable oil is substantially free or free of palm oil and the sugar content of the spread is less than about 20% by weight of the total spread. The food spread possesses excellent properties and is advantageously spreadable at low temperature.

19 Claims, No Drawings

(56) References Cited

OTHER PUBLICATIONS

Fat and Oil Melt Point Temperatures—Monounsaturated, Polyunsaturated and Saturated Fat Contents—Veganbaking.net—Recipes, desserts and tips www.veganbaking.net/articles/tools/fat-and-oil-melt-point-temperatures (8 pages).

Extended European Search Report issued in corresponding EP Application No. 18808706.8 dated Jul. 8, 2021 (12 bages).

Examination Report issued in corresponding SA Application No. 519410642 with English report thereof dated Sep. 27, 2021 (13 pages).

Examination Report issued in corresponding RU Application No. 2019143771 with English translation dated Oct. 4, 2021 (4 pages).

Office Action issued in corresponding BR Application No. BR112019025170-7 dated Sep. 6, 2022 (4 pages).

The healthy foodie, Sneak Recipe from Paleo Home Cooking Dark Chocolate and Hazelnut Spread (aka Homemade Nutella), [online], Aug. 20, 2015 < https://thehealthyfoodie.com/dark-chocolate-and-hazelnut-spread-aka-homemade-nutella/> (10 pages).

A Healthy Homemade Chocolate Hazelnut Spread, DIYNatural, [online], Oct. 28, 2018 <https://web.archive.org/web/20151028235008/https://www.diynatural.com/homemade-nutella/> (10 pages).

Office Action issued in corresponding JP Application No. 2019-566738 with English translation dated Mar. 28, 2022 (10 pages).

\* cited by examiner

FOOD PRODUCT AND METHOD OF MANUFACTURE

FIELD

The present disclosure relates to a spreadable food product and more particularly, but not exclusively, to a spread containing a nut product, such as hazelnuts, and/or chocolate. The disclosure also relates to a method of manufacturing such a spreadable food product.

BACKGROUND

Spreads such as hazelnut spread and chocolate spread are typically prepared by mixing palm oil with a hazelnut paste and/or cocoa. These spreads also contain sugar for sweetness, and have high sugar content.

Palm oil is an edible vegetable oil derived from the fruit of oil palms. It is one of the few highly saturated vegetable fats and is semisolid at room temperature. Palm oil is a common cooking ingredient in Africa, Southeast Asia and parts of Brazil. Its use in the commercial food industry in other parts of the world is widespread because of its relatively low cost.

There have recently been concerns about the widespread use of palm oil in commercial food products because of the adverse environmental effect of deforestation for the development of oil palm plantations. It is therefore desirable to provide an alternative hazelnut or chocolate spread which does not contain palm oil.

Replacing palm oil in a hazelnut or chocolate spread is not a simple task. The texture and viscosity of the spread must be such that it can readily be removed from its storage container, such as a jar, and applied as a spread, for example to bread, by using an item of cutlery, such as a knife.

One problem with some commercially available hazelnut and chocolate spreads is that the mixture of components may become unstable, leading to the palm oil separating from the mixture over time. This can lead to globules of fat appearing in the mixture which is not an appealing appearance, and it may also affect the taste and texture of the spread when consumed.

Another problem experienced with some commercially available hazelnut and chocolate spreads is that the spreadability can decrease over time and the spread can become too hard to apply at room temperature. Also, the temperature range within which the spread is easy to apply may be limited. For example, some commercially available hazelnut spreads are not suitable for storing in a refrigerator after the container, for example jar, in which the spread is stored has been opened. This is because the spread becomes hard at low temperatures, and is difficult to spread immediately after removal from the refrigerator. Further, above a certain temperature, the spread becomes less viscous and difficult to remove from a container with a kitchen implement, such as a knife, which is used to apply the spread.

A further problem with commercially available hazelnut spreads is the high sugar content, which not only has health issues, but also causes problems in manufacturing plants because it is difficult to clean the production lines without leaving residual sugar and palm oil in the pipes.

It is therefore desirable to provide a sweet spread, such as a hazelnut or chocolate spread, in which one or more of the problems above are alleviated. It is also desirable to provide a sweet spread which provides a healthier and more environmentally friendly alternative.

The reference in this specification to any prior publication (or information derived from it), or to any matter which is known, is not, and should not be taken as an acknowledgement or admission or any form of suggestion that that prior publication (or information derived from it) or known matter forms part of the common general knowledge in the field of endeavour to which this specification relates.

SUMMARY

According to one aspect of the present disclosure there is provided a low sugar content sweet food spread comprising:
at least one of a cocoa product and a nut product;
at least one vegetable oil;
and at least one sweetener;
wherein the at least one vegetable oil does not contain palm oil, and
the sugar content of the spread is less than about 20% by weight of the total spread.

According to another aspect of the present disclosure there is provided a low sugar content sweet food spread comprising:
at least one of a cocoa product and a nut product;
at least one vegetable oil;
and at least one sweetener;
wherein the at least one vegetable oil is substantially free of palm oil, and
the sugar content of the spread is less than about 20% by weight of the total spread.

By 'substantially free of palm oil' it is meant that the palm oil content of the food spread is less than 20%, or less than 15%, or less than 10%, or less than 5%, or less than 4%, or less than 3%, or less than 2%, or less than 1% by weight of the total spread.

According to another aspect of the present disclosure, there is provided a method of manufacturing a low sugar content sweet food spread comprising the steps of: mixing a vegetable oil with at least one of a cocoa product and a nut product, at least one sweetener, and optionally other ingredients, wherein the at least one vegetable oil does not contain palm oil, and the sugar content of the spread is less than about 20% by weight of the total ingredients.

According to another aspect of the present disclosure, there is provided a method of manufacturing a low sugar content sweet food spread comprising the steps of: mixing a vegetable oil with at least one of a cocoa product and a nut product, at least one sweetener, and optionally other ingredients, wherein the at least one vegetable oil is substantially free of palm oil, and the sugar content of the spread is less than about 20% by weight of the total ingredients.

Preferably, the sugar content of the spread is less than about 15%, more preferably less than 10%, and even more preferably less than 5% by weight of the total spread.

In a particularly preferred embodiment, the sugar content of the spread is not more than about 3%, preferably between 1% and 2%, and more preferably about 1.7% by weight of the total spread.

A particular advantage of the presently disclosed food spread is that it has excellent spreading and spooning characteristics when stored at normal refrigerator temperatures, in contrast to prior art food spreads.

DESCRIPTION OF PREFERRED EMBODIMENTS

Before the present compositions, components and/or methods are disclosed and described, it is to be understood that unless otherwise indicated this invention is not limited to specific compositions, components, methods, or the like, as such may vary, unless otherwise specified. It is also to be understood that the terminology used herein is for the purpose of describing particular embodiments only and is not intended to be limiting.

It must also be noted that, as used in the specification and the appended claims, the singular forms 'a', 'an' and 'the' include plural referents unless otherwise specified. Thus, for example, reference to 'a sweetener' may include more than one sweetener, and the like.

Throughout this specification, use of the terms "comprises" or "comprising" or grammatical variations thereon shall be taken to specify the presence of stated features, integers, steps or components but does not preclude the presence or addition of one or more other features, integers, steps, components or groups thereof not specifically mentioned.

The Sweetener

The sweetener is not only present to replace sugar as a sweetener, but also present as a bulking agent to add bulk to the spread.

The sweetener is preferably present in the spread in an amount of at least about 10% by weight of the total spread, and more preferably at least about 20%. Preferably the amount of sweetener in the spread is not more than about 70% by weight of the total spread by weight, and more preferably not more than about 60%. The amount of sweetener in the spread may fall substantially in the range from 10% to 70%, and more preferably from 20% to 60% of the total weight of the spread. In one particularly preferred embodiment, the sweetener is present in the spread in an amount of about 38% by weight of the total spread. In another particularly preferred embodiment the sweetener is present in the spread in an amount of about 41% by weight of the total spread.

The sweetener preferably comprises at least one naturally occurring sweetener.

In one preferred embodiment, the sweetener includes at least one sugar alcohol, preferably a mixture of sugar alcohols. In another preferred embodiment a single sugar alcohol may be included, for example maltitol.

The sweetener preferably includes a high intensity sweetener, such as one or more steviol glycosides.

The sweetener preferably includes at least one sugar alcohol in combination with a high intensity sweetener, such as one of more steviol glycosides.

The at least one sugar alcohol in the sweetener may be selected from one or more of the following: maltitol, erythritol, isomalt, lactitol, mannitol, sorbitol, xylitol, polydextrose, D-tagatose and oligofructose The at least one steviol glycoside may include one or more of the following: stevioside, rebaudioside, A, rebaudioside B, rebaudioside C, rebaudioside D, rebaudioside E, dulcoside A.

In a particularly preferred embodiment, the sweetener comprises a mixture of maltitol, erythritol, and steviol glycosides.

The maltitol is preferably present in the spread in an amount of at least 10% by weight of the total spread, and more preferably at least 18%. Preferably the amount of maltitol in the spread is preferably not more than about 40% by weight of the total spread by weight. The amount of maltitol in the spread may fall substantially in the range from 10% to 40%, and more preferably from 18% to 40% of the total weight of the spread. In one particularly preferred embodiment, the maltitol is present in the spread in an amount of about 23% by weight of the total spread. In another preferred embodiment the maltitol is present in an amount of about 36% of the total spread.

The erythritol is preferably present in the spread in an amount of at least 1% by weight of the spread, and more preferably at least about 3% Preferably the amount of erythritol in the spread is not more than about 35% by weight of the total sweetener by weight, and more preferably not more than about 25% The amount of erythritol in the spread may fall substantially in the range from 1% to 35%, and more preferably from 3% to 25% of the total weight of the spread. In one particularly preferred embodiment, the erythritol is present in the sweetener in an amount of about 15% by weight of the total spread.

The steviol glycosides are preferably present in the spread in an amount of at least 0.005% by weight of the total spread, and more preferably at least about 0.025% Preferably the amount of steviol glycosides in the spread is not more than about 0.055% by weight of the total spread by weight, and more preferably not more than about 0.035%. The amount of steviol glycosides in the spread may fall substantially in the range from 0.005% to 0.055% and more preferably from about 0.025% to about 0.035% of the total weight of the spread In one particularly preferred embodiment, the steviol glycosides are present in the sweetener in an amount of about 0.03% by weight of the total spread.

In one preferred embodiment, the sweetener comprises a mixture of maltitol, erythritol, steviol glycosides in the following approximate percentages of the total weight of the sweetener:

Maltitol - about 23 %
Erythritol about 15%
Steviol glycosides about 0.03%.

In another preferred embodiment, the sweetener comprises a mixture of maltitol, erythritol, steviol glycosides in the following approximate percentages of the total weight of the sweetener:

Maltitol - about 36%
Erythritol about 5%
Steviol glycosides about 0.03%.

The use of sugar alcohols as sweeteners and a bulking agent instead of sugar in the spread provides a healthier alternative to consumers. The use of sugar alcohols, such as maltitol and erythritol eliminates the problem of dental decay that is common with spreads containing sugars, and the use of a naturally occurring high intensity sweetener such as steviol glycosides provides the consumer with a product with no artificial ingredients.

It also has the additional advantage that it is easier to clean the production lines in a manufacturing facility when sugar alcohols are used as a sweetener. It is difficult to clean pipes in a production line if a high amount of sugar is used as an ingredient because residual sugar is often present in the lines after they are flushed. If an existing production line which uses sugar is converted to one for production of the spread of the disclosure, the pipes can be flushed with some of the raw ingredients to clean the pipes in the production lines to remove any residual sugar remaining in the pipes.

Vegetable Oil

An edible vegetable oil is provided as a lubricant in the spread to provide a suitable consistency to enable the spread to be removed from a storage container, such as a jar, and spread on bread or the like using a cutlery utensil, such as a knife.

The vegetable oil preferably contains a high proportion of polyunsaturated fats.

In some embodiments the vegetable oil comprises at least 50% of oils having a polyunsaturated oil content of 20% or more.

Preferably the vegetable oil contains a low proportion of saturated fats.

In some embodiments the vegetable oil comprises less than 70% of oils having a saturated fat content of 25% or less. Preferably 80% of oils having an unsaturated fat content of 20% or less.

The vegetable oil is preferably present in the spread in an amount greater than 15% by weight of the total spread, and more preferably greater than about 18%. Preferably the amount of vegetable oil in the spread is not more than about 50% by weight of the total spread by weight, and more preferably not more than 40% The amount of vegetable oil in the spread may fall substantially in the range from greater than 15% to about 60%, and more preferably from 15% to 50% of the total weight of the spread. In one particularly preferred embodiment, the vegetable oil is present in the spread in an amount of about 20% by weight of the total spread.

The at least one vegetable oil is preferably selected from the following: sunflower oil, coconut oil, rapeseed oil, shea oil, soya bean oil, olive oil, peanut oil, safflower oil, cottons seed oil, maize oil.

In another embodiment the at least one vegetable oil is preferably selected from the following: sunflower oil, coconut oil, rapeseed oil, shea oil, soya bean oil, peanut oil, safflower oil, cottons seed oil, maize oil.

In another embodiment the at least one vegetable oil is preferably selected from the following: sunflower oil, coconut oil, rapeseed oil, shea oil, soya bean oil, peanut oil, safflower oil, cottons seed oil, maize oil and is substantially free or free of olive oil.

By 'substantially free of olive oil' it is meant that the amount of olive oil in the composition is less than 2% or less than 1% by weight of the total spread.

The vegetable oil may comprise a single vegetable oil, such as sunflower oil. Alternatively the vegetable oil may comprise a mixture of two or more oils.

The vegetable oil may comprise a mixture of saturated and unsaturated oils.

In a particularly preferred embodiment, the vegetable oil comprises a mixture of sunflower oil, rapeseed oil, coconut oil and shea oil.

The sunflower oil is preferably present in the spread in an amount of at least 1% by weight of the total spread, and more preferably at least 2%. Preferably the amount of sunflower oil in the spread is not more than about 40% by weight of the total spread, and more preferably not more than about 25%. The amount of sunflower oil in the spread may fall substantially in the range from 1% to 40% and more preferably from 2% to 25% of the total weight of the spread. In one particularly preferred embodiment, the sunflower oil is present in the spread in an amount of about 18% by weight of the total spread.

The rapeseed oil is preferably present in the spread in an amount of at least 1% by weight of the total spread, and more preferably at least 2%. Preferably the amount of rapeseed oil in the spread is not more than about 40% by weight of the total spread, and more preferably not more than about 25%. The amount of rapeseed oil in the spread may fall substantially in the range from 1% to 40% and more preferably from 2% to 25% of the total weight of the spread. In one particularly preferred embodiment, the rapeseed oil is present in the spread in an amount of about 10% by weight of the total spread.

The coconut oil is preferably present in the spread in an amount of at least about 1% by weight of the total spread. Preferably the amount of coconut oil in the spread is not more than about 10% by weight of the total spread by weight, and more preferably not more than about 5%. The amount of coconut oil in the spread may fall substantially in the range from 1% to 10% and more preferably from 1% to 5% of the total weight of the spread. In one particularly preferred embodiment, the coconut oil is present in the spread in an amount of about 1% by weight of the total spread.

The shea oil is preferably present in the spread in an amount of at least about 1% by weight of the total spread. Preferably the amount of shea oil in the spread is not more than about 10% by weight of the total spread by weight, and more preferably not more than about 5%. The amount of shea oil in the spread may fall substantially in the range from 1% to 10% and more preferably from 1% to 5% of the total weight of the spread. In one particularly preferred embodiment, the shea oil is present in the spread in an amount of about 1% by weight of the total spread.

In one preferred embodiment, the vegetable oil comprises a mixture of sunflower oil, rapeseed oil, coconut oil and shea oil in the following approximate percentages of the total weight of the spread:

Sunflower oil - about 18%
Rapeseed oil - about 10%
Coconut oil - about 1%
Shea oil - about 1%.

In another preferred embodiment, the vegetable oil comprises a mixture of sunflower oil and coconut oil in the following approximate percentages of the total weight of the spread:

Sunflower oil - about 18%
Coconu oil - about 1%.

Importantly, the vegetable oil is substantially free or free of palm oil. The use of palm oil not only has an adverse environmental effect, but also can have carcinogenic effects when the palm oil is refined and heated at high temperatures.

The combination of vegetable oils in the preferred embodiments has a reduced melt temperature than pure palm oil or oil mixtures rich in palm oil. This lowers the temperature of processing, thus reducing energy requirements, and the requirement for tempering (which ensures granular particles are thoroughly blended with the cocoa ingredients).

Chocolate and/or Nut Flavouring

The spread preferably includes chocolate flavouring in the form of at least one cocoa product, such as cocoa powder and/or cocoa butter.

The at least one cocoa product is preferably present in the spread in an amount of at least about 2% by weight of the total spread, and more preferably at least about 3%. Preferably the amount of cocoa product in the spread is not more than about 40% by weight of the total spread by weight, and more preferably not more than about 25%. The amount of cocoa product in the spread may fall substantially in the range from 2% to 40%, and more preferably from 3% to 25% of the total weight of the spread. In one particularly preferred embodiment, the cocoa product is present in the spread in an amount of about 12% by weight of the total spread.

In one preferred embodiment, the spread includes both cocoa powder and/or cocoa butter.

The cocoa powder is preferably present in the spread in an amount of at least about 2% by weight of the total spread, and more preferably at least about 5%. Preferably the amount of cocoa powder in the spread is not more than about 25% by weight of the total spread by weight, and more preferably not more than about 15%. The amount of cocoa powder the spread may fall substantially in the range from 2% to 25% and more preferably from 5% to 15% of the total weight of the spread. In one particularly preferred embodiment, the cocoa powder is present in the spread in an amount of about 7.4% by weight of the total spread.

Preferably, fat-reduced cocoa powder is used so that the fat content of the spread is not increased by too much.

The cocoa butter is preferably present in the spread in an amount of at least about 1% by weight of the total spread, and more preferably at least about 3%. Preferably the amount of cocoa butter in the spread is not more than about 15% by weight of the total spread by weight, and more preferably not more than about 8%. The amount of cocoa butter in the spread may fall substantially in the range from 1% to 15%, and more preferably from 3% to 8% of the total weight of the spread. In one particularly preferred embodiment, the cocoa butter is present in the spread in an amount of about 4.5% by weight of the total spread.

The spread preferably also includes at least one nut product, such as a nut paste, nut powder or nuts that have been ground. The nut product may be selected from any one or more of the following: hazelnuts, almonds, walnuts, peanuts, cashews, macadamias, chestnuts, brazil nut, pecan nuts, pistachio nuts, and pine nuts.

The nut product may be present in the spread in an amount of at least about 2% by weight of the total spread, and preferably at least about 5%. Preferably the amount of nut product in the spread is not more than about 20% by weight of the total spread by weight, and more preferably not more than about 15%. The amount of nut product in the spread may fall substantially in the range from 2% to 20%, and more preferably from 5% to 15% of the total weight of the spread. In one particularly preferred embodiment, the nut product is present in the spread in an amount of about 10% by weight of the total spread.

In one preferred embodiment, the nut product consists of hazelnut paste or ground hazelnuts. The amount of hazelnut paste or ground hazelnuts in the spread may fall substantially in the range from 2% to 20%, and more preferably from 5% to 15% of the total weight of the spread. In one particularly preferred embodiment, the hazelnut paste or ground hazelnuts is present in the spread in an amount of about 10% by weight of the total spread.

Other Ingredients

The spread may include other ingredients, including:
carbohydrates and polysaccharides, such as maltodextrin, fructo-oligosaccharides, polyols, starch, and soy powder;
emulsifiers, such as lecithin, esters of mono- and di-glycerides, vegetable gums and chemical based emulsifiers; and
milk products, such as whey, milk fats, and milk powders (full fat or skimmed).

The maltodextrin or other polysaccharides are preferably present in the spread in an amount of at least about 1% by weight of the total spread. Preferably the amount of maltodextrin or other polysaccharides in the spread is not more than about 40% by weight of the total spread by weight, and more preferably not more than about 20%. The amount of maltodextrin or other polysaccharides in the spread may fall substantially in the range from 1% to 40% and more preferably from 1% to 20% of the total weight of the spread. In one particularly preferred embodiment, the maltodextrin or other polysaccharides is present in the spread in an amount of about 17% by weight of the total spread.

The lecithin or other emulsifiers are preferably present in the spread in an amount of at least about 0.05% by weight of the total spread, and more preferably at least about 0.1%. Preferably the amount of lecithin or other emulsifiers in the spread is not more than about 5% by weight of the total spread by weight, and more preferably not more than about 1%. The amount of lecithin or other emulsifiers in the spread may fall substantially in the range from 0.05% to 5% and more preferably from 0.1% to 1% of the total weight of the spread. In one particularly preferred embodiment, the lecithin or other emulsifiers is present in the spread in an amount of about 0.5 % by weight of the total spread.

The lecithin is preferably derived from a natural source, such as soya beans, eggs, milk, marine sources, rapeseed, cottonseed, and sunflower. In one preferred embodiment, the lecithin is derived from sunflower oil The milk product is preferably in the form of whey powder, more preferably sweet whey powder.

The whey and/or other milk products are preferably present in the spread in an amount of at least about 1% by weight of the total spread. Preferably the amount of whey and/or other milk products in the spread is not more than about 25% by weight of the total spread by weight, and more preferably not more than about 5% The amount of whey and/or other milk products in the spread may fall substantially in the range from 1% to 25% and more preferably from 1% to 5% of the total weight of the spread. In one particularly preferred embodiment, the whey and/or other milk products is present in the spread in an amount of about 1% by weight of the total spread.

Other Flavourings

Various other flavourings may be added to the ingredients of the spread provide different or enhanced flavours. For example, fruit flavourings such as citrus, orange, strawberry, banana etc. and/or other flavourings, such as vanilla extract, coffee, peppermint, cookies and cream, smarties, caramel, licorice, biscuit, coconut, gingerbread, etc. may be added.

Nutritional Content

The fat content of the spread is provided primarily by the vegetable oil, with additional fat content provided by some of the other ingredients, such as cocoa butter.

The spread preferably has a fat content of not more than about 35% and more preferably not more than about 33% by weight of the total spread.

The amount of saturated fat in the spread is preferably not more than about 10% and more preferably not more than about 7% by weight of the total spread.

The total fat content of the spread preferably falls substantially in the range from 25% to 35% and more preferably from 27% to 33% of the total weight of the spread.

The saturated fat content of the spread preferably falls substantially in the range from 3% to 10% and more preferably from 5% to 7% of the total weight of the spread.

In one particularly preferred embodiment, the total fat content is about 32% by weight of the total spread, and the saturated fat content of the spread is preferably about 6% of the total weight of the spread.

The carbohydrate content of the spread is provided primarily by the sweetener with additional carbohydrate content provided by some of the other ingredients, such as maltodextrin.

The spread preferably has a carbohydrate content of not more than about 60% and more preferably not more than about 55% by weight of the total spread.

The amount of sugars in the spread is preferably not more than about 5% and more preferably not more than about 3% by weight of the total spread.

The total carbohydrate content of the spread preferably falls substantially in the range from 50% to 60% and more preferably from 54% to 60% of the total weight of the spread.

The total sugar content of the spread preferably falls substantially in the range from 1% to 5% and more preferably from 1% to 3% of the total weight of the spread.

In one particularly preferred embodiment, the total carbohydrate content is about 55% by weight of the total spread, and the sugar content of the spread is preferably about 1.7% of the total weight of the spread.

The fibre content of the spread is provided mainly by the nut product, such as hazelnut paste or ground hazelnuts.

The total fibre content of the spread preferably falls substantially in the range from 1% to 10% and more preferably from 2.5% to 5% of the total weight of the spread.

In one preferred embodiment, the total fibre content is about 3.4% by weight of the total spread.

The protein content of the spread is provided mainly by the nut product, and by any milk products such as whey.

The total protein content of the spread preferably falls substantially in the range from 1% to 10% and more preferably from 2.5% to 5% of the total weight of the spread.

In one preferred embodiment, the total protein content is about 3.4% by weight of the total spread.

In an exemplary embodiment there is provided a food spread comprising:
  20-60% by weight sweetener, said sweetener comprising sugar alcohols and steviol glycosides;
  15 to 50% by weight vegetable oil;
  10 to 20% by weight maltodextrin;
  5 to 15% by weight ground hazelnuts;
  5 to 15% by weight cocoa powder; and
  1 to 10% by weigh cocoa butter;
  wherein said food spread is free or substantially free of palm oil; and
  wherein said food spread comprises less than 5% by weight sugar.

Preferably the vegetable oil is free or substantially free of olive oil.
Preferably the amount of sugar is less than 2% by weight.
Preferably the sugar alcohols are a mixture of erythritol and maltitol.

In another exemplary embodiment there is provided a food spread comprising:
  20-60% by weight sweetener, said sweetener comprising sugar alcohols and steviol glycosides;
  15 to 50% by weight vegetable oil;
  10 to 20% by weight maltodextrin;
  5 to 15% by weight ground hazelnuts;
  5 to 15% by weight cocoa powder; and
  1 to 10% by weigh cocoa butter;
  wherein said food spread is free of palm oil; and
  wherein said food spread comprises less than 5% by weight sugar.

Preferably the vegetable oil is free or substantially free of olive oil.
Preferably the amount of sugar is less than 2% by weight.
Preferably the sugar alcohols are a mixture of erythritol and maltitol.

In another exemplary embodiment there is provided a food spread comprising:
  20-60% by weight sweetener, said sweetener comprising sugar alcohols and steviol glycosides;
  15 to 50% by weight vegetable oil;
  10 to 20% by weight maltodextrin;
  5 to 15% by weight ground hazelnuts;
  5 to 15% by weight cocoa powder; and
  1 to 10% by weigh cocoa butter;
  wherein said food spread is free of palm oil and olive oil; and
  wherein said food spread comprises less than 5% by weight sugar.

Preferably the amount of sugar is less than 2% by weight.
Preferably the sugar alcohols are a mixture of erythritol and maltitol.

In another exemplary embodiment there is provided a food spread comprising:
  20-60% by weight sweetener, said sweetener consisting of sugar alcohols and steviol glycosides;
  15 to 50% by weight vegetable oil;
  10 to 20% by weight maltodextrin;
  5 to 15% by weight ground hazelnuts;
  5 to 15% by weight cocoa powder; and
  1 to 10% by weigh cocoa butter;
  wherein said food spread is free of palm oil and olive oil.

Example—Hazelnut Spread

In one example of a preferred embodiment, a hazelnut spread was prepared by mixing together the following ingredients by weight:

a sweetener (comprising a mixture of maltitol, erythritol and steviol glycosides) - 35 to 45%;
a vegetable oil (comprising a mixture of sunflower oil and coconut oil) - 15-30%
maltodextrin - 13-20%
ground hazelnuts - 8-12%
fat reduced cocoa powder -about 6-9%
cocoa butter - about 3-7%
emulsifier (lecithin from sunflower) –0.2-2%
sweet whey powder - 0.05-1%.

The nutritional content of the example was compared with the following commercially available hazelnut spreads which contain palm oil and/or sugar:

NUTELLA™ Hazelnut Spread which contains sugar; vegetable oil (palm); hazelnuts (13%), skim milk powder, fat-reduced cocoa powder, emulsifier-lecithin (soy); flavouring (vanillin).

NUTINO™ Hazelnut Spread which contains sugar; vegetable oil (unspecified); hazelnuts (13%), skim milk powder, milk whey powder; lactose; fat-reduced cocoa powder, emulsifier-lecithin (soy); flavouring (vanillin).

KRAFT™ Hazelnut Spread which contains sugar; vegetable oil (unspecified); hazelnuts (13%), cocoa powder (6%); milk solids; emulsifiers (471, 322); salt; flavour. The results of the comparison are given in Table 1 below:

TABLE 1

| Nutritional Content - | Example of the present disclosure Average values Per 100 g | NUTELLA ™ Hazelnut Spread - Average values Per 100 g | NUTINO ™ Hazelnut Spread Average values Per 100 g | KRAFT ™ Hazelnut Spread Average values Per 100 g |
| --- | --- | --- | --- | --- |
| Fat | 31.7 g | 30.4 g | 31.7 | 39.0 g |
| Saturated fat | 6.1 g | 9.8 g | 9.0 g | 7.7 g |
| Carbohydrate | 54.7 g | 58.4 g | 59.0 g | 52.0 gg |
| Sugar content | 1.7 g | 57.6 g | 52.3 g | 52.0 g |
| Fibre | 3.4 g | Not specified | Not specified | Not specified |
| Protein | 3.4 g | 6.3 g | 4.7 g | 3.6 g |
| Salt/Sodium | 10 mg | 34 mg | 95 mg | 100 mg |
| Energy | 1940 kJ/ 468 kcal | 2225 kJ | 2274 kJ | 2400 kJ |

NUTELLA is a registered trade mark of Ferrero S.p.A.
NUTINO is a registered trade mark of Cantarella Bros Pty Ltd.
KRAFT is a registered trade mark of Kraft Foods Group Brands LLC.

Nutritional Content of Example compared to some other commercially available brands of Hazelnut Spread which contain palm oil and/or sugar.

The nutritional content of the example was also compared with the following commercially available hazelnut spreads:

NOCCIOLATA™ Hazelnut Spread which contains cane sugar, hazelnut paste, sunflower oil, cocoa powder, cocoa butter, lecithin (sunflower), vanilla extract.

DIABLO™ Hazelnut Spread which contains: maltitol; vegetable oil (rapeseed, palm); hazelnuts (13%), fat-reduced cocoa, skim milk powder; whey powder, emulsifier-lecithins (sunflower), flavouring.

WYLDSSON™ Hazelnut & Cocoa Nut Butter which contains roasted hazelnuts (30%), deglet nour dates, roasted sunflower seeds, roasted cashew nuts, organic Peruvian cocoa.

MERIDIAN™ Cocoa and Hazelnut Butter which contains roasted hazelnuts, honey, cocoa powder, coconut and sunflower oil.

The results of the comparison are given in the tables below:

TABLE 2

| Nutritional Content - | Example of the present disclosure Average values Per 100 g | NOCCIOLATA ™ Hazelnut Spread - Average values Per 100 g | DIABLO ™ Hazelnut Spread Average values Per 100 g |
| --- | --- | --- | --- |
| Fat | 31.7 g | 32.4 g | 37.0 g |
| Saturated fat | 6.1 g | 5.9 g | 7.6 g |
| Carbohydrate | 54.7 g | 61.8 g | 49.0 g |
| Sugar content | 1.7 g | 50.0 g | 8.7 g |
| Fibre | 3.4 g | 5.9 g | 2.8 g |
| Protein | 3.4 g | 5.9 g | 6.4 g |
| Salt/Sodium | 10 mg | 0 mg | 210 mg |
| Energy | 1940 kJ 468 kcal | 559 kcal | 2046 kJ 494 kcal |

NOCCIOLATA ™ is a trade mark of Rigoni di Asagio USA, LLC.
DIABLO ™ is a trade mark of Diablo Confectionery.

TABLE 3

| Nutritional Content - | Example of the present disclosure Average values Per 100 g | WYLDSSON ™ Hazelnut & Cocoa Nut Butter Average values Per 100 g | MERIDIAN ™ Cocoa and Hazelnut Butter Average values Per 100 g |
| --- | --- | --- | --- |
| Fat | 31.7 g | 40.0 g | 59.9 g |
| Saturated fat | 6.1 g | 4.7 g | 10.4 g |
| Carbohydrate | 54.7 g | 30.0 g | 14.5 g |
| Sugar content | 1.7 g | 23.3 g | 9.5 g |
| Fibre | 3.4 g | 6.0 g | 5.6 g |
| Protein | 3.4 g | 13.3 g | 13.2 g |
| Salt/Sodium | 10 mg | 10 mg | <10 mg |
| Energy | 1940 kJ/ 468 kcal | 2260 kJ/ 546 kcal | 2730 kJ/ 661 kcal |

It will be seen from the tables above that the sugar content of the preferred example of the present disclosure is significantly less than all the commercially available brands of hazelnut spreads used in the comparison. Also, the only commercially available brands in the comparison which have a sugar content less than 20% are DIABLO' Hazelnut Spread, and MERIDIAN™ Cocoa and Hazelnut Butter. DIABLO' Hazelnut Spread contains palm oil and only uses a single sugar alcohol, maltitol, as a sweetener to replace sugar. MERIDIAN' Cocoa and Hazelnut Butter contains honey and has a significantly higher fat content than the example of the disclosure. Preferred embodiments of the present disclosure do not contain any palm oil, and use a combination of sugar alcohols and a natural intense sweetener to replace sugar.

The present disclosure therefore provides a healthier, environmentally friendly alternative hazelnut spread in that it has significantly reduced sugar content and does not contain any palm oil.

The combination of the choice and level of ingredients in embodiments of the disclosure, with the replacement of sugar (sucrose) and palm oil, produces a product that has improved temperature and oxidation stability as well as emulsion stability.

Embodiments of the present disclosure produce a product that remains 'spoonable' when stored at temperatures between 3 and 30° C., without any separation of the liquid oil and solid ingredients, and the product remains in a similar condition throughout its expected shelf life. The product also imparts a pleasant taste/aroma and has a pleasing texture in the mouth when consumed.

Table 4 below collects the results of spreadability and spoonability tests comparing a food spread according to the present disclosure with Nutella™, Nutino™, and a Coles supermarket own brand hazelnut spread. The food spread according to the present disclosure had the following composition.

A sweetener (comprising a mixture of maltitol, erythritol and steviol glycosides) - 35 to 45%;
a vegetable oil (comprising a mixture of sunflower oil and coconut oil) - 15-30%
maltodextrin - 13-20%
ground hazelnuts - 8-12%
fat reduced cocoa powder -about 6-9%
cocoa butter - about 3-7%
emulsifier (lecithin from sunflower) –0.2-2%
sweet whey powder - 0.05-1%.

Each of the food spreads were stored in a refrigerator for 23 days at 3° C. The spoonability test was performed with a clean metal teaspoon which was at room temperature. The spreadability test was conducted by placing a 15 g sample of the spread on a slice of room temperature white bread and attempting to spread the food spread evenly over the surface of the bread using a plain dinner knife which was at room temperature.

TABLE 4

| Food spread | Spoonability 23 days; 3° C. | Spreadability 23 days; 3° C. |
| --- | --- | --- |
| Present disclosure | Quite good | Fairly stiff, but still possible |
| Nutella ™ | Too hard | Not possible |
| Nutino ™ | Too hard | Not possible |
| Coles brand | Too hard | Not possible |

The results clearly indicate that the spread according to the present disclosure is the only one that can be spread on a slice of bread when the spread is stored for an extended period of time at refrigerator temperature. The other spreads cannot be spread at refrigerator temperature and are too stiff and break up the bread.

The spoonability tests support the spreadability results clearly demonstrating that a food spread according to the present disclosure can be spooned at 3° C. whereas the comparative materials cannot. The comparative materials were all too hard to be removed from their containers by a spoon.

The spreadability and spoonability of the food spread of the present disclosure are highly advantageous and quite unexpected. The food spreads according to the present disclosure may be stored for extended periods of time in a refrigerator and used immediately in applications requiring spooning or spreading, while not having to be warmed to a higher temperature.

Table 5 collects various other parameters comparing a food spread according to the present disclosure with Nutella™, Nutino™, and a Coles supermarket own brand hazelnut spread. The evaluations were performed on the products after storage at 3° C. for 23 days.

TABLE 5

| Food spread | |
| --- | --- |
| | Appearance; 23 days; 3° C. |
| Present disclosure | Acceptable |
| Nutella™ | Acceptable |
| Nutino™ | Some dryness |
| Coles brand | Some cracking Oil exudation |
| Present disclosure | None apparent |
| Nutella™ | Small bubbles of oil present |
| Nutino™ | Small bubbles of oil present |
| Coles brand | Small bubbles of oil present Long/short break* |
| Present disclosure | Short and acceptable |
| Nutella™ | Hard chunks |
| Nutino™ | Hard chunks |
| Coles brand | Hard chunks |

*Long/short break is the ease of separating a spoon/knife of product from the bulk according to the length of the "tail" remaining immediately after complete separation.

Overall, the food spread of the present disclosure performed the best and is the only one that retains spreadability, spoonability, lack of oil exudation, an acceptable break, and good overall appearance when stored at refrigerator temperatures It will be appreciated that various modifications may be made to the preferred embodiments described above without departing from the scope and spirit of the disclosure. For example, other flavourings, such as vanilla extract, coffee, peppermint, etc and/or fruit flavourings could be added to provide different flavours.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited.

All documents cited are herein fully incorporated by reference for all jurisdictions in which such incorporation is permitted and to the extent such disclosure is consistent with the description of the present disclosure.

The invention claimed is:

1. A low sugar content sweet food spread comprising:
   20-60% by weight sugar alcohols and high intensity sweetener, wherein the food spread comprises at least 20% by weight sugar alcohols;
   15 to 50% by weight of at least one vegetable oil;
   1 to 40% by weight maltodextrin or another carbohydrate or polysaccharide selected from fructooligosaccharides, starch and soy powder;
   2 to 20% by weight of at least one nut product;
   2 to 25% by weight cocoa powder; and
   1 to 15% by weight cocoa butter;
   wherein the sugar alcohols and high intensity sweetener, the at least one vegetable oil, the maltodextrin or another carbohydrate or polysaccharide, the at least one nut product, the cocoa powder, and the cocoa butter make up at least 90% by weight of the food spread,
   wherein a palm oil content of the food spread is less than 5% by weight of the total spread; wherein said food spread comprises less than 10% by weight sugar; and wherein the vegetable oils in combination have a reduced melt temperature compared to pure palm oil, and
   wherein the food spread is spreadable at 3° C.

2. A food spread according to claim 1, wherein the sugar alcohols and high intensity sweetener, the at least one vegetable oil, the maltodextrin or another carbohydrate or polysaccharide, the at least one nut product, the cocoa powder, and the cocoa butter make up at least 94% by weight of the food spread.

3. A food spread according to claim 1, wherein the sugar alcohols and high intensity sweetener, the at least one vegetable oil, the maltodextrin or another carbohydrate or polysaccharide, the at least one nut product, the cocoa powder, and the cocoa butter make up at least 96% by weight of the food spread.

4. A food spread according to claim 1, wherein the sugar content of the food spread is less than 5% by weight of the total spread.

5. A food spread according to claim 1, wherein the at least one vegetable oil is selected from the following: sunflower oil, coconut oil, rapeseed oil, rhea oil, soya bean oil, olive oil, peanut oil, safflower oil, cottons seed oil, maize oil.

6. A food spread according to claim 1, wherein the food spread is free of palm oil.

7. A food spread according to claim 1, wherein the food spread contains less than 2% by weight olive oil.

8. A food spread according to claim 1, wherein the sugar alcohols are a mixture of maltitol and erythritol.

9. A food spread according to claim 1, wherein the high intensity sweetener is one or more steviol glycosides.

10. A food spread according to claim 9, wherein the amount of steviol glycosides in the spread falls substantially in the range from 0.005% to 0.055% of the total weight of the spread.

11. A food spread according to claim 1, wherein the amount of vegetable oil in the spread falls substantially in the range from 15% to 40% of the total weight of the spread.

12. A food spread according to claim 1, wherein the amount of cocoa butter in the spread falls substantially in the range from 1 to 10% of the total weight of the spread.

13. A food spread according to claim 1, wherein the amount of cocoa powder in the spread is from 5 to 15% by weight.

14. A food spread according to claim 1, wherein the amount of maltodextrin or other carbohydrate or polysaccharide in the spread falls substantially in the range from 1 to 20% of the total weight of the spread.

15. A food spread according to claim 1, wherein the total sugar content of the spread falls substantially in the range from 1 to 3% of the total weight of the spread.

16. A food spread according to claim 1, further comprising an emulsifier in an amount from 0.1 to 2% by weight.

17. A food spread according to claim 1, wherein the at least one nut product is a nut paste or ground nuts.

18. A food spread according to claim 1, wherein the fat content of the food spread is not more than about 35% by weight.

19. A food spread according to claim 1, wherein the saturated fat content of the food spread is not more than about 10% by weight.

* * * * *